Oct. 15, 1929.  M. H. MARTIN  1,732,133
ABSORPTION MECHANISM
Original Filed Aug. 23, 1926
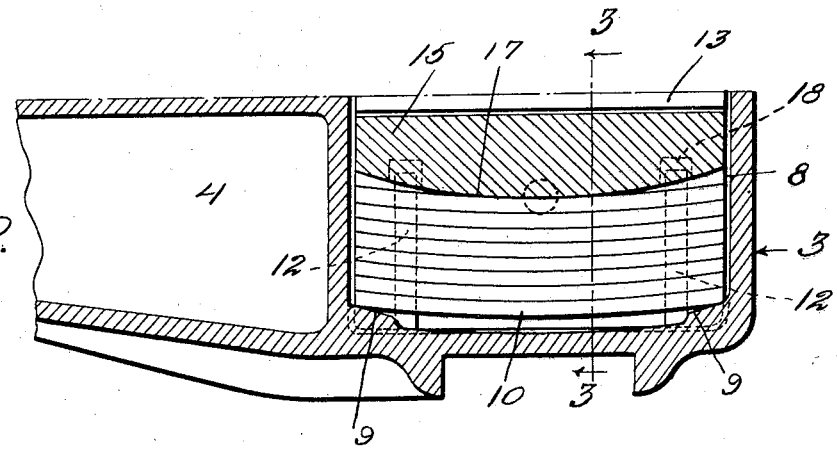
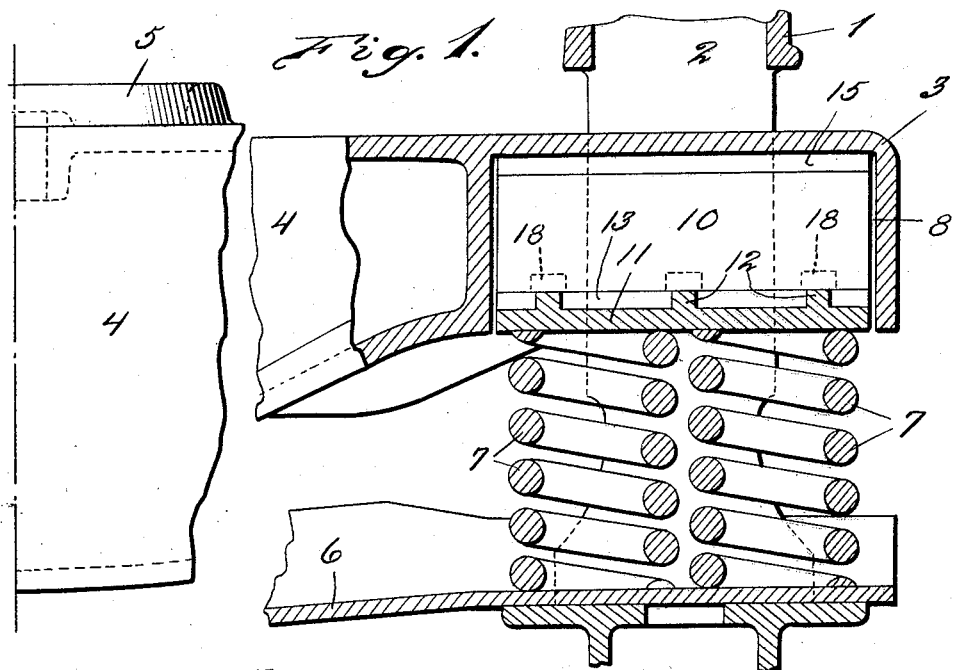
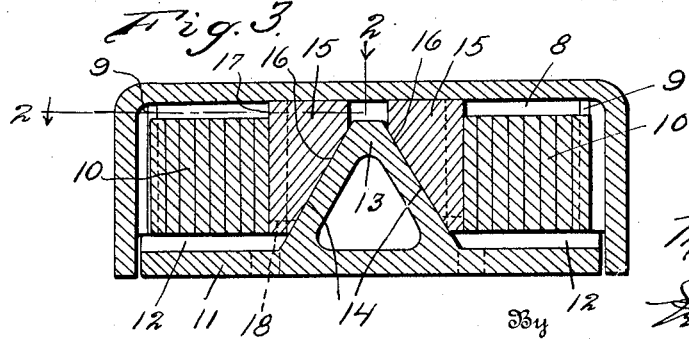
Inventor
Mark H. Martin
By
his Attorney Patented Oct. 15, 1929

1,732,133

UNITED STATES PATENT OFFICE

MARK H. MARTIN, OF READING, PENNSYLVANIA, ASSIGNOR, BY MESNE ASSIGNMENTS, TO T. H. SYMINGTON AND SON, INC., OF BALTIMORE, MARYLAND, A CORPORATION OF MARYLAND

ABSORPTION MECHANISM

Application filed August 23, 1926, Serial No. 131,003. Renewed June 8, 1929.

The invention relates to railroad car truck bolsters, particularly to spring or cushioning means independent of the usual helical spring mounting.

The principal object of the invention, generally stated, is to provide, in a truck bolster, spring means independent of but in series with the usual helical spring means in conjunction with friction wedge elements, the whole cooperating to define an absorption mechanism which will provide proper cushioning action under any and all car loads, excess pressure on the usual or helical springs being avoided.

An important object of the invention is to provide an auxiliary spring mechanism which, in addition to assisting the usual helical springs, in so far as preventing the bringing of excessive loads upon them, will also act to avoid excessive car roll or side sway.

A further object of the invention is to provide a truck bolster in which auxiliary spring means is provided in series with the usual helical springs so as to change the periodicity of oscillation of these springs, this last named feature being the principal one in avoiding excessive car roll.

Still another object of the invention is to provide a truck bolster with auxiliary spring means therein of higher capacity than the usual helical or truck springs, excessive loads being therefore cushioned so that excessive strains on the side frames, bolsters, axles, wheels, etc., will be prevented.

A more specific object of the invention is to provide an absorption mechanism mounted or located preferably within the bolster itself and embodying flat plate or leaf springs coacting with wedge operated followers which operate to cause flexure of the spring plates.

A still further object of the invention is to provide a spring mechanism of this character so constructed and arranged that the absorption operation will not affect the coupler height for the light car.

Yet another object of the invention is to provide an absorption mechanism of this character which may be built into already existing bolsters or those of slightly modified types, the arrangement being such that there will be no necessity for making any alterations in or additions to the usual helical spring structure, side frames or other parts.

An additional object of the invention is the provision of an absorption mechanism for truck bolsters which will be simple and inexpensive in manufacture, easy to install, positive in action, efficient and durable in service, and a general improvement in the art.

With the above and other objects and advantages in view, the invention consists in the details of construction and arrangement of parts to be hereinafter more fully described and claimed, and illustrated in the accompanying drawing in which:

Figure 1 is a vertical sectional view taken longitudinally through a portion of a truck bolster with the invention in applied position, Figure 2 is a horizontal sectional view taken through one half of the end portion of the bolster showing a plan of one group or bank of plate or leaf springs, the view being taken on the line 2—2 of Figure 3, Figure 3 is a vertical cross sectional view through the end portion of the bolster, the view being taken on the line 3—3 of Figure 2.

Referring more particularly to the drawing, the numeral 1 designates a portion of a truck side frame having the usual window opening 2 within which extends the end 3 of the truck bolster 4 having the usual center bearing 5 for the support of the body bolster, not shown. At the bottom of the window opening is the usual spring plank 6 on which are mounted the ordinary helical springs 7 which engage beneath the bolster for resiliently supporting the same.

Under ordinary circumstances the bolster extension 3 is provided with rigid means engaging upon the helical springs. In accordance with the present invention, I provide an absorption mechanism, which may conveniently be built into the extension 3 which is of course hollow and open bottomed for the purpose. In other words the extension 3 is formed with a pocket 8, the inner corners of which may be formed with inwardly extending vertically arranged and laterally inclined ledges 9 which constitute abutments for the ends of groups or banks of plate or leaf springs 10. As the ledges 9, or their equivalent, are provided it is clear that there will be space between the outermost leaves and the adjacent walls of the pockets, this space permitting flexure of the springs by means to be described.

Located within the bottom of the pocket is a plate 11 capable of vertical movement with respect to the bolster, and this plate rests upon the upper ends of the helical springs 7. It is preferable that the upper surface of the plate be formed with upstanding spaced ribs 12 on which the lower edges of the springs 10 rest, ribs being provided for the purpose of reducing the area of contact thereof with the plate 11.

In order to act upon the springs 10 so as to obtain yieldable resistance to upward movement of the plate 11 with respect to the bolster, or in other words downward movement of the bolster with respect to the spring plank, the plate member 11 is preferably provided at its center with an upstanding projection 13 here disclosed as having its opposite sides 14 inclined so as to constitute, in effect, a double wedge. Located at opposite sides of this projection 13 are follower blocks 15 which have inclined faces or surfaces 16 engaging against the inclined faces or surfaces 14 of the projection or double wedge member 13. The outer surfaces of the follower blocks 15 are convex as illustrated at 17, these convex faces bearing against the innermost ones of the leaf or plate springs in the banks or groups 10. To avoid interference between the ribs 12 and the follower blocks 15 when the latter move downwardly, as they will, with respect to the plate 11, the lower edges of the follower blocks are preferably notched or grooved as illustrated at 18.

In the assembling of the structure it will be apparent that initially or when originally applied the plate or leaf springs 10 are straight or plane. When weight is applied to the truck bolster the downward movement of the follower blocks 15 with respect to the spring seat 11 will result in outward movement owing to the coaction of the inclined faces 14 and 16. Lateral pressure is thus produced against the banks or groups of leaf springs and they will be flexed as indicated in Figure 2. The position of the parts disclosed in the drawings is that which they will assume under light car conditions, the spring seat 11 and bottom of the bolster being substantially flush. In view of this fact the coupler height for the light car is not affected by the movement in the absorption device. Under loaded car conditions and when there is any tendency of the car to develop roll or side sway, the added strain applied to the follower blocks 15 and tending to force them downwardly will cause them to separate or move outwardly to a still greater extent, this movement being opposed partly by the springs 10 themselves and partly by the development of friction between the inclined surfaces 14 and 16 and between the outer faces 17 of the follower blocks and the contacting leaves of the springs 10. Clearly any tendency toward side roll will consequently be checked. It is obvious that the arrangement is such that the springs 10 are in series with the helical springs 7, the result being that the spring capacity is greatly increased and the bringing of excessive loads upon the helical springs avoided, it being evident that there will be less strain upon these and all the other parts of the truck as well as the rails. Furthermore the provision of the leaf springs will change the periodicity of oscillation of the helical springs, not only preventing side roll but tending to eliminate "jiggling".

From the foregoing description and a study of the drawing it will be apparent that I have thus provided a very simply constructed and arranged absorption mechanism which is capable of being built into trucks of ordinary types or those slightly modified for the accommodation of the additional elements. It is clear that all of the advantages and benefits sought will be attained by the employment of this structure.

While I have shown and described a preferred embodiment of the invention and a certain specific arrangement of wedge elements for producing flexure of the auxiliary spring members it should be understood that the entire disclosure is merely an exemplification of the principles involved as the right is reserved to make all such changes and modifications in the details of construction and the arrangement and location of parts, provided such variations constitute no departure from the spirit of the invention or the scope of the claims hereunto appended.

Having thus described the invention, I claim:

1. In combination with a truck bolster and spring supporting means therefor, absorption mechanism interposed between the bolster and said spring means for operation in series with the latter and including a plurality of plate springs, and car load operating wedge means for producing friction and for flexing said plate springs.

2. In combination with a truck bolster and spring supporting means therefor, absorption mechanism mounted within the bolster and including a plurality of plate springs acting always in series with said spring means, followers engaging the plate springs, and wedge means for moving the followers.

3. In combination with a truck bolster and the spring supporting means therefor, an absorption mechanism including banks of plate springs mounted within the bolster, a spring seat engaged upon said spring means and supporting said plate springs, followers engaging said banks of plate springs, and a wedge element on the spring seat cooperating with said followers for flexing said plate springs.

4. In combination with a truck bolster and supporting spring means therefor, absorption mechanism including a spring seat mounted for vertical movement within the bolster and engaged upon said spring means, an upstanding wedge element on said spring seat, banks of plate springs within the bolster at opposite sides of said wedge element, and followers interposed between said wedge element and said banks of plate springs and having inclined surfaces cooperating with said wedge element for flexing said plate springs.

5. In combination with a truck bolster and supporting spring means therefor, an absorption mechanism including a vertically movable spring seat engaged upon said spring means and formed centrally with an upstanding wedge element, banks of plate springs on said spring seat at opposite sides of said wedge element arranged edgewise in upright position, and followers located at opposite sides of said wedge element and engaging said plate springs for flexing the same in accordance with load variations.

6. In combination with a truck bolster and supporting spring means therefor, an absorption mechanism including a vertically movable spring seat engaged upon said spring means and formed centrally with an upstanding wedge element, banks of plate springs on said spring seat at opposite sides of said wedge element arranged edgewise in upright position, and followers located at opposite sides of said wedge element and engaging said plate springs for flexing the same in accordance with load variations, the spring seat having supporting ribs arranged transversely of the plate springs.

7. In combination with a truck bolster and supporting spring means therefor, an absorption mechanism including a vertically movable spring seat engaged upon said spring means and formed centrally with an upstanding wedge element, banks of plate springs on said spring seat at opposite sides of said wedge element arranged edgewise in upright position, followers located at opposite sides of said wedge element and engaging said plate springs for flexing the same in accordance with load variations, the spring seat having supporting ribs arranged transversely of the plate springs, and said followers being grooved for the accommodation of said ribs.

8. In combination with a truck bolster and spring supporting means therefor, absorption mechanism including a pair of banks of plate springs arranged to operate in series with said spring means, and load operated wedge means located between the banks of springs for flexing the same, said plate springs operating always in series with said spring supporting means.

9. In combination with a truck bolster and spring supporting means therefor, the bolster having a pocket opening out at its under side, a supporting element mounted for vertical movement within said pocket and contained entirely therein, a bank of plate springs within the pocket upon said supporting element and arranged in edgewise upright position, and means operable upon movement of said supporting element with respect to the bolster for applying flexing pressure to said plate springs.

10. In combination with a truck bolster and spring supporting means therefor, the bolster having a pocket opening out at its under side, a supporting element mounted for vertical movement within said pocket and contained entirely therein, a bank of plate springs within the pocket upon said supporting element and arranged in edgewise upright position, and means operable upon movement of said supporting element with respect to the bolster for applying flexing pressure to said plate springs and developing frictional resistance to movement.

11. In combination with a truck bolster and spring supporting means therefor, a downwardly opening pocket at each end of the bolster, inwardly projecting ledges at the corners of the pocket, a seat member movably mounted within the bottom of the pocket and engaged upon said spring supporting means, banks of plate springs located in upright edgewise position within the pocket with the ends of the outermost plates engaged against said ledges, upstanding wedge means on the seat member at substantially the center thereof, and followers located at opposite sides of the wedge means and engaging against the inner sides of the banks of springs, said followers having inclined surfaces cooperating with said wedge means and having their spring engaging faces convex for flexing the plate springs upon upward movement of the seat member.

In testimony whereof I affix my signature.

MARK H. MARTIN.